US011745742B2

(12) United States Patent
Russell et al.

(10) Patent No.: US 11,745,742 B2
(45) Date of Patent: Sep. 5, 2023

(54) PLANNING STOPPING LOCATIONS FOR AUTONOMOUS VEHICLES

(71) Applicant: Waymo LLC, Mountain View, CA (US)

(72) Inventors: Jared Stephen Russell, San Francisco, CA (US); Dmitri A. Dolgov, Los Altos, CA (US); Nathaniel Fairfield, Mountain View, CA (US); Laura Estelle Lindzey, Austin, TX (US); Christopher Paul Urmson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 174 days.

(21) Appl. No.: 17/232,680

(22) Filed: Apr. 16, 2021

(65) Prior Publication Data

US 2021/0276554 A1    Sep. 9, 2021

Related U.S. Application Data

(63) Continuation of application No. 16/238,135, filed on Jan. 2, 2019, now Pat. No. 11,034,351, which is a
(Continued)

(51) Int. Cl.
*B60W 30/18* (2012.01)
*G05D 1/02* (2020.01)
(Continued)

(52) U.S. Cl.
CPC ......... *B60W 30/18* (2013.01); *G01C 21/3407* (2013.01); *G01C 21/3867* (2020.08);
(Continued)

(58) Field of Classification Search
None
See application file for complete search history.

(56) References Cited

U.S. PATENT DOCUMENTS

| 8,412,449 B2 | 4/2013 | Trepagnier et al. |
| 8,749,401 B2 | 6/2014 | Hara et al. |

(Continued)

FOREIGN PATENT DOCUMENTS

| CN | 101351685 A | 1/2009 |
| CN | 102679993 A | 9/2012 |

(Continued)

OTHER PUBLICATIONS

Notice of Allowance and Translation for Chinese Patent Application No. 201780063646.6, dated Aug. 18, 2021.
(Continued)

*Primary Examiner* — Tamara L Weber
(74) *Attorney, Agent, or Firm* — Botus Churchill IP Law LLP

(57) ABSTRACT

Aspects of the disclosure relate to generating a speed plan for an autonomous vehicle. As an example, the vehicle is maneuvered in an autonomous driving mode along a route using pre-stored map information. This information identifies a plurality of keep clear regions where the vehicle should not stop but can drive through in the autonomous driving mode. Each keep clear region of the plurality of keep clear regions is associated with a priority value. A subset of the plurality of keep clear regions is identified based on the route. A speed plan for stopping the vehicle is generated based on the priority values associated with the keep clear regions of the subset. The speed plan identifies a location for stopping the vehicle. The speed plan is used to stop the vehicle in the location.

20 Claims, 12 Drawing Sheets

Related U.S. Application Data continuation of application No. 15/293,503, filed on Oct. 14, 2016, now Pat. No. 10,202,118.

(51) Int. Cl.

| | |
|---|---|
| *G08G 1/00* | (2006.01) |
| *G08G 1/0962* | (2006.01) |
| *G08G 1/0967* | (2006.01) |
| *G01C 21/34* | (2006.01) |
| *G01C 21/00* | (2006.01) |
| *G05D 1/00* | (2006.01) |
| *G08G 1/16* | (2006.01) |

(52) U.S. Cl.
CPC ......... *G05D 1/0088* (2013.01); *G05D 1/0214* (2013.01); *G08G 1/00* (2013.01); *G08G 1/09623* (2013.01); *G08G 1/09626* (2013.01); *G08G 1/096725* (2013.01); *G08G 1/202* (2013.01); *B60W 2400/00* (2013.01); *B60W 2554/00* (2020.02); *B60W 2720/10* (2013.01); *G08G 1/167* (2013.01)

(56) References Cited

U.S. PATENT DOCUMENTS

| | | | |
|---|---|---|---|
| 8,751,154 | B2 | 6/2014 | Zhang et al. |
| 9,459,623 | B1 | 10/2016 | Raghu |
| 2008/0147305 | A1 | 6/2008 | Kawamata et al. |
| 2009/0319112 | A1 | 12/2009 | Fregene et al. |
| 2012/0083959 | A1 | 4/2012 | Dolgov et al. |
| 2012/0161951 | A1 | 6/2012 | Ito et al. |
| 2014/0309833 | A1 | 10/2014 | Ferguson et al. |
| 2014/0330479 | A1 | 11/2014 | Dolgov et al. |
| 2015/0166062 | A1 | 6/2015 | Johnson et al. |
| 2015/0251565 | A1 | 9/2015 | Bourdon et al. |
| 2015/0353082 | A1 | 12/2015 | Lee et al. |
| 2016/0129907 | A1 | 5/2016 | Kim et al. |
| 2016/0139598 | A1 | 5/2016 | Ichikawa et al. |
| 2016/0185348 | A1 | 6/2016 | Miura et al. |
| 2016/0229402 | A1 | 8/2016 | Morita et al. |
| 2016/0335892 | A1 | 11/2016 | Okada et al. |
| 2017/0158193 | A1 | 6/2017 | Lopez et al. |
| 2018/0238696 | A1 | 8/2018 | Takeda |

FOREIGN PATENT DOCUMENTS

| | | |
|---|---|---|
| CN | 103339010 A | 10/2013 |
| CN | 103440767 A | 12/2013 |
| CN | 104949678 A | 9/2015 |
| CN | 105405308 A | 3/2016 |
| CN | 105741595 A | 7/2016 |
| DE | 102014220685 A1 | 4/2016 |
| EP | 3023963 A1 | 5/2016 |
| JP | 2012247315 A | 12/2012 |
| JP | 2015219119 A | 12/2015 |
| KR | 20130132790 A | 12/2013 |
| KR | 20150127745 A | 11/2015 |
| KR | 101664582 B1 | 10/2016 |
| WO | 2014148975 A1 | 9/2014 |
| WO | 2017013750 A1 | 1/2017 |

OTHER PUBLICATIONS

Australian Office Action for Application No. 2017343547 dated Nov. 27, 2019.
Canadian Office Action for Application No. 3,039,913 dated Mar. 17, 2020.
Charalampidis et al., "Speed Profile Optimization for Vehicles Crossing an Intersection Under a Safety Constraint", 2014, 2014 European Control Conference (ECC), p. 2894-2901 (Year: 2014).
Extended European Search Report dated May 25, 2020 for European Patent Application No. 17860645.5.
Japanese Decision of Rejection for Application No. 2019-516386 dated Aug. 7, 2020.
Japanese Office Action for Application No. 2019516386 dated Apr. 27, 2020.
Notice of Preliminary Rejection in Korean Patent Application No. 10-2020-7037463, dated Feb. 2, 2021 With English Translation.
Republic of Korea Notice of Preliminary Rejection for Application No. 10-2019-7010291 dated Mar. 23, 2020.
Singapore Notice of Eligibility for Grant for Application No. 11201902621R dated Aug. 16, 2020.
Singapore Search Report and Written Opinion for Application No. 11201902621R dated Jan. 28, 2020.
"International Search Report and Written Opinion for International Application No. PCT/US2017/055324, dated Jan. 23, 2018", 19 pages.
Alonso, et al., "Autonomous Vehicle Control Systems for Safe Crossroads", Centro de Automatica y Robotica {CAR), Madrid, Spain, Jun. 5, 2011, 16 pages.
Oshana, et al., "Software Engineering for Embedded Systems", Methods, Practical Techniques, and Applications, 2013, 15 pages.
Notice of Allowance for Korean Application No. 10-2020-7037463 dated Apr. 16, 2021.

PLANNING STOPPING LOCATIONS FOR AUTONOMOUS VEHICLES

CROSS-REFERENCE TO RELATED APPLICATIONS

The present application is a continuation of U.S. patent application Ser. No. 16/238,135, filed Jan. 2, 2019, which is a continuation of U.S. patent application Ser. No. 15/293,503, filed on Oct. 14, 2016, issued as U.S. Pat. No. 10,202,118, the disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

BRIEF SUMMARY

Aspects of the disclosure provided a method of maneuvering a vehicle in an autonomous driving mode. The method includes maneuvering, by one or more processors, the vehicle in the autonomous driving mode along a route using pre-stored map information identifying a plurality of keep clear regions where the vehicle should not stop but can drive through in the autonomous driving mode. Each keep clear region of the plurality of keep clear regions is associated with a priority value. The method also includes identifying, by the one or more processors, a subset of the plurality of keep clear regions based on the route; generating, by the one or more processors, a speed plan for stopping the vehicle based on the priority values associated with the keep clear regions of the subset of the plurality of keep clear regions, wherein the speed plan identifies a location for stopping the vehicle; and using, by the one or more processors, the speed plan to stop the vehicle.

In one example, determining the speed plan includes adjusting a default minimum clearance value for a given keep clear region of the subset of the plurality of keep clear regions, the given keep clear region has a lowest priority value of all of the keep clear regions of the subset of the plurality of keep clear regions, and the default minimum clearance value defines an acceptable amount of overlap with the given keep clear region. In another example, determining the speed plan includes adjusting a given keep clear region of the subset of the plurality of keep clear regions, and the given keep clear region has a lowest priority value of all of the keep clear regions of the subset of the plurality of keep clear regions. In another example, the speed plan avoids stopping within a particular keep clear region of the subset of the plurality of keep clear regions, the particular keep clear region is associated with a highest priority value of all of the keep clear regions of the subset of the plurality of keep clear regions. In another example, at least one of the subset of the plurality of keep clear regions corresponds to an active crosswalk and at least one of the subset of the plurality of keep clear regions corresponds to an inactive crosswalk, the active crosswalk is associated with a higher priority value than the inactive crosswalk. In another example, at least one of the subset of the plurality of keep clear regions corresponds to an active crosswalk, at least one of the subset of the plurality of keep clear regions corresponds to an intersection, and the active crosswalk is associated with a higher priority value than the intersection. In another example, at least one of the subset of the plurality of keep clear regions corresponds to an inactive crosswalk and at least one of the subset of the plurality of keep clear regions corresponds to an intersection, the intersection being associated with a higher priority value than the inactive crosswalk. In another example, at least one of the subset of the plurality of keep clear regions corresponds to an area that crosses a lane of traffic. In another example, at least one of the subset of the plurality of keep clear regions corresponds to a posted "keep Clear" or "Don't Block the Box" area. In another example, at least one of the plurality of keep clear regions correspond to a railroad crossing.

Another aspect of the disclosure provides a system for maneuvering a vehicle in an autonomous driving mode. The system includes one or more processors configured to maneuver the vehicle in the autonomous driving mode along a route using pre-stored map information identifying a plurality of keep clear regions where the vehicle should not stop but can drive through in the autonomous driving mode. Each keep clear region of the plurality of keep clear regions is associated with a priority value. The one or more processors are also configured to identify a subset of the plurality of keep clear regions based on the route, generate a speed plan for stopping the vehicle based on the priority values associated with the keep clear regions of the subset of the plurality of keep clear regions, wherein the speed plan identifies a location for stopping the vehicle and use the speed plan to stop the vehicle.

In one example, determining the speed plan includes adjusting a default minimum clearance value for a given keep clear region of the subset of the plurality of keep clear regions, the given keep clear region has a lowest priority value of all of the keep clear regions of the subset of the plurality of keep clear regions, and the default minimum clearance value defines an acceptable amount of overlap with the given keep clear region. In another example, determining the speed plan includes adjusting a given keep clear region of the subset of the plurality of keep clear regions, wherein the given keep clear region has a lowest priority value of all of the keep clear regions of the subset of the plurality of keep clear regions. In another example, the speed plan avoids stopping within a particular keep clear region of the subset of the plurality of keep clear regions, the particular keep clear region is associated with a highest priority value of all of the keep clear regions of the subset of the plurality of keep clear regions. In another example, at least one of the subset of the plurality of keep clear regions corresponds to an active crosswalk, at least one of the subset of the plurality of keep clear regions corresponds to an inactive crosswalk, and the active crosswalk is associated with a higher priority value than the inactive crosswalk. In another example, at least one of the subset of the plurality of keep clear regions corresponds to an active crosswalk, at least one of the subset of the plurality of keep clear regions corresponds to an intersection, and the active crosswalk is associated with a higher priority value than the intersection. In another example, at least one of the subset of the plurality of keep clear regions corresponds to an inactive crosswalk, at least one of the subset of the plurality of keep clear regions corresponds to an intersection, and the intersection is associated with a higher priority value than the inactive crosswalk. In another example, the system also includes the vehicle.

A further aspect of the disclosure provides a non-transitory computer readable medium on which instructions are stored. The instructions, when executed by one or more processors, cause the one or more processors to perform a method of maneuvering a vehicle in an autonomous driving mode. The method includes maneuvering the vehicle in the autonomous driving mode along a route using pre-stored map information identifying a plurality of keep clear regions where the vehicle should not stop but can drive through in the autonomous driving mode. Each keep clear region of the plurality of keep clear regions is associated with a priority value. The method also includes identifying, a subset of the plurality of keep clear regions based on the route, generating a speed plan for stopping the vehicle based on the priority values associated with the keep clear regions of the subset of the plurality of keep clear regions, wherein the speed plan identifies a location for stopping the vehicle, and using the speed plan to stop the vehicle.

In one example, determining the speed plan includes adjusting a given keep clear region of the subset of the plurality of keep clear regions, and the given keep clear region has a lowest priority value of all of the keep clear regions of the subset of the plurality of keep clear regions.

DETAILED DESCRIPTION

Overview

Figure 1:
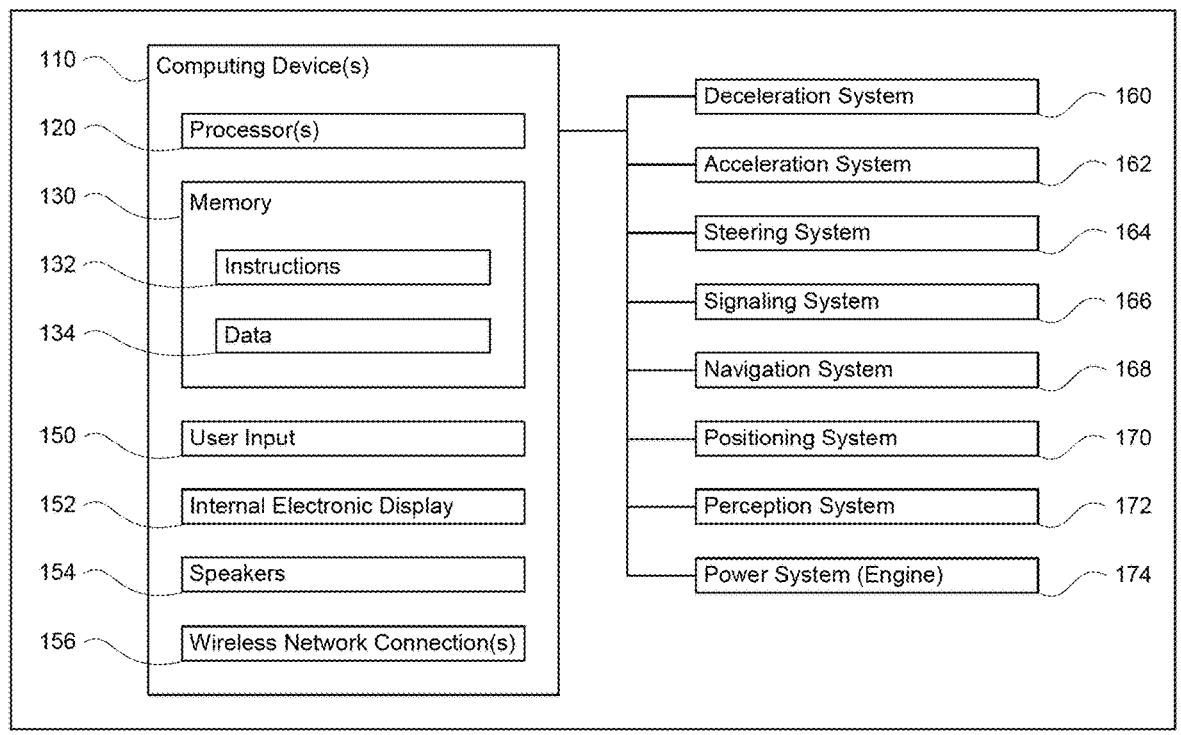
FIG. 1 is a functional diagram of an example vehicle in accordance with an exemplary embodiment.

Aspects of the technology relate to controlling autonomous vehicles and determining where best to stop those vehicles when needed. For instance, there are certain "keep clear" regions where a vehicle should not stop such as railroad crossings, crosswalks, intersections, across a lane of traffic, and regions specifically designated as no stopping zones (areas designated by "Don't Block the Box" or "Keep Clear" signs or indicators). While a vehicle may safely travel through these regions, stopping in such regions for prolonged period of times may not only be unlawful, but could put the safety and comfort of other road users, such as passengers or drivers of other vehicles, pedestrians or bicyclists, at risk.

In order to avoid these locations, the vehicle's computing devices may have access to pre-stored map information. The pre-stored map information may thus include highly detailed maps of a vehicle's expected environment (lane lines, traffic signals, stop signs, etc.) as well as information identifying the shape and location of the keep clear regions. Alternatively, some regions may be detected in real time, by detecting signs or indicators (such as markings on a roadway) and determining that these signs and indicators correspond to additional keep clear regions.

In addition to pre-stored map information, the computing devices may rely on information detected by the vehicle's perception system. For instance, the vehicle's sensors may detect and identify various objects in the vehicle's environment as well as information such as location, speed, orientation, status (i.e. color of a traffic signal), etc.

As the vehicle is maneuvered along a route to a destination, the computing devices may combine the map information and information from the perception system to continuously make a speed plan. For instance, a speed plan may be generated based on a plurality of constraints, such as maintaining a separation distance from other vehicles, ensuring there is no overlap in time and space with a projected location of other objects, etc.

As part of this speed plan, the computing devices may determine an ideal location where the vehicle is able to stop within some short period of time into the future, before the vehicle reaches some specified region of space or point in time, or within some distance along the route without stopping in any of the keep clear regions identified in the map. The speed plan may also include information for controlling the deceleration of the vehicle (i.e. how abruptly the vehicle must stop) in order to reach that ideal location.

If the computing device determines that the vehicle needs (or is very likely to need) to stop, the computing devices can determine and use the speed plan to and control the vehicle in order to stop the vehicle in the ideal location of the speed plan. Stop may be necessitated by other vehicles, objects or debris in the roadway, traffic lights, pedestrians, etc.

In some instances, there may be many different relevant keep clear regions that the vehicle may reach within the short period of time or distance along the route. In this example, keep clear regions may be prioritized based on type. This information may also be stored in the detailed map information with each region.

In order to generate a speed plan where there are multiple keep clear regions, the computing devices may identify a subset of keep clear regions that are relevant to the vehicle's path and current location. For each relevant keep clear region, the computing devices may generate a corresponding constraint, for instance, that the vehicle cannot stop in that keep clear region. The computing devices may attempt to generate a speed plan that solves for all of the keep clear constraints. If this is not possible, the computing devices may relax the lowest priority constraints and try again. This may be repeated as many times as necessary until a feasible speed plan is generated. In some instances, no feasible speed plan may be possible, even where relaxing constraints. In this instance, if blocking a higher priority region is inevitable, the computing devices may take some type of reconciliation action, such as changing lanes, moving in reverse, moving over, calling for help, etc.

The features described herein promote the safe operation of a vehicle in an autonomous driving mode by avoiding stopping in regions through which the vehicle is otherwise permitted to travel. In addition, by prioritizing keep clear regions, the computing devices can avoid the need for more dramatic maneuvers (breaking or last minute lane changes) which would be otherwise unnecessary. This may reduce the discomfort of passenger as well as discomfort for persons in other vehicles arising from the perception that the vehicle has stopped somewhere that it should not have done, regardless of whether there is any actual risk in a given situation. Moreover, by considering a maximum allowed braking profile in order to stop outside each type of keep clear region, the vehicle can minimize the risk of rear-end collision with trailing vehicles by relaxing certain constraints. In addition, by using a speed plan that considers the stopping location of a value, in the event of a vehicle malfunction, the vehicle is less likely to be located in an inappropriate or dangerous location.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, navigation system 168, positioning system 170, and perception system 172, and power system 174 in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160, acceleration system 162 and/or power system 174 (such as a gas or electric engine) in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
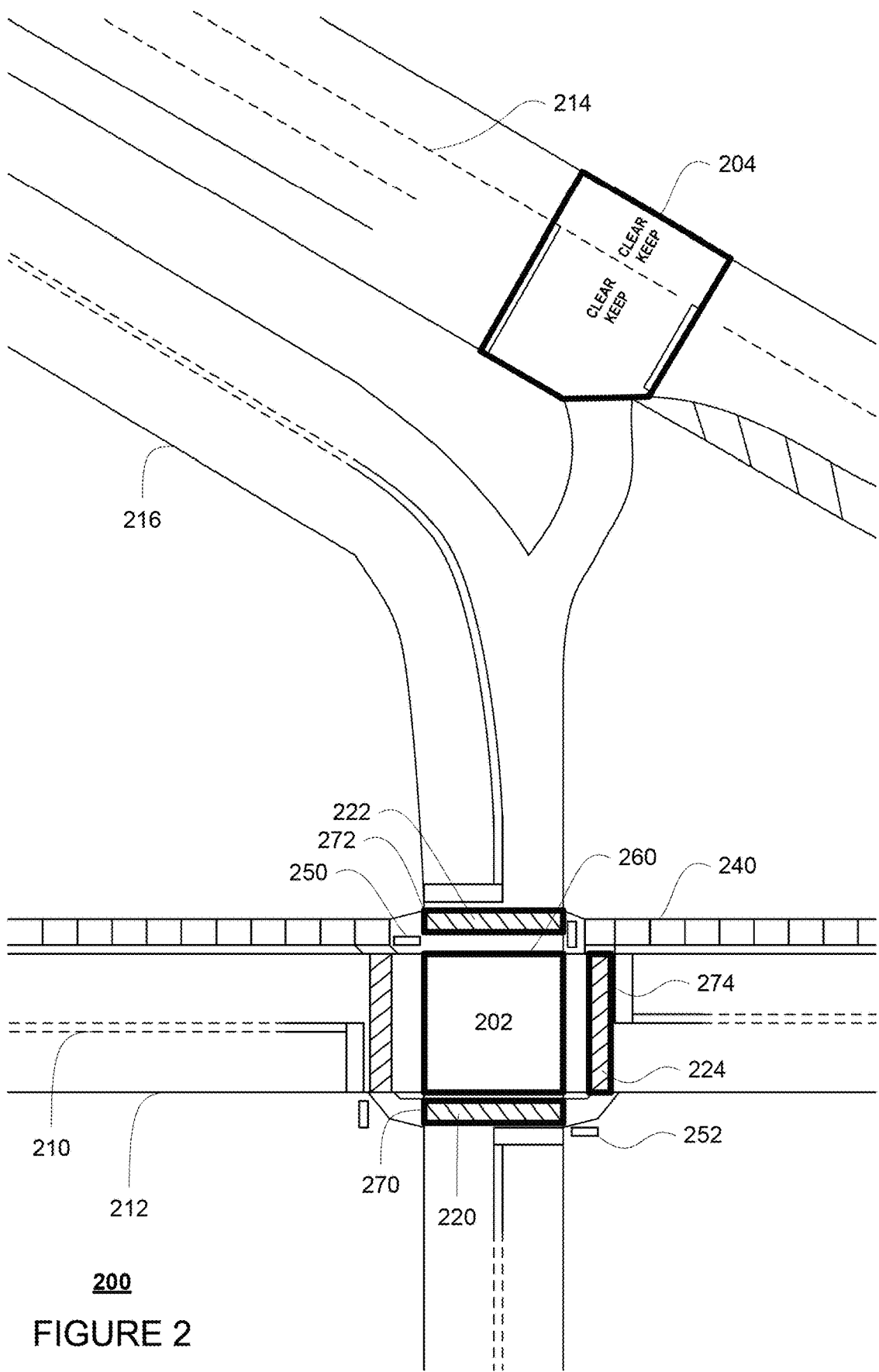
FIG. 2 is a diagram of map information in accordance with an exemplary embodiment.
Figure 3A:
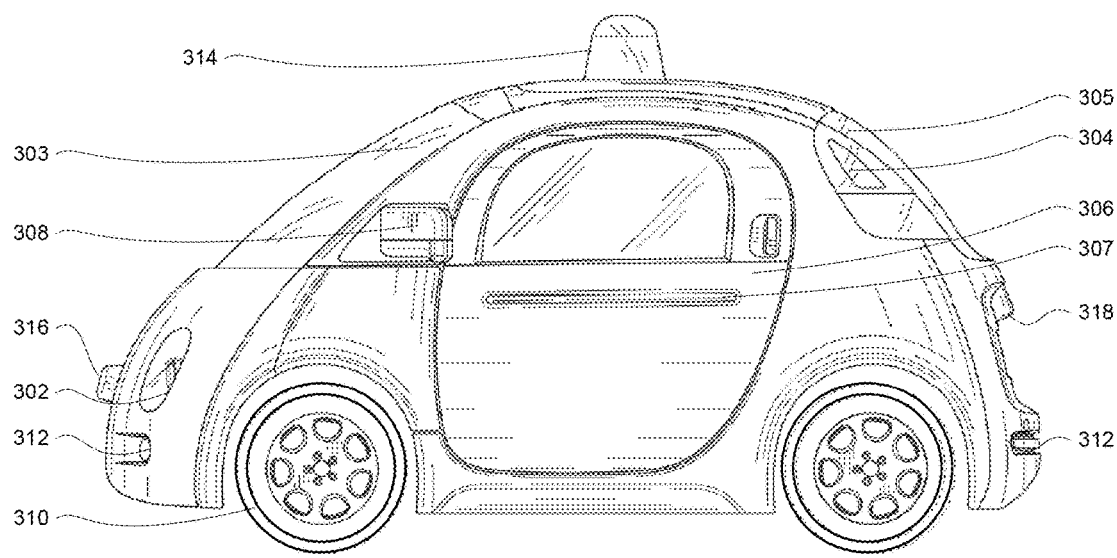
FIGS. 3A-3D are example external views of a vehicle in accordance with aspects of the disclosure.
Figures 3B, 3C:
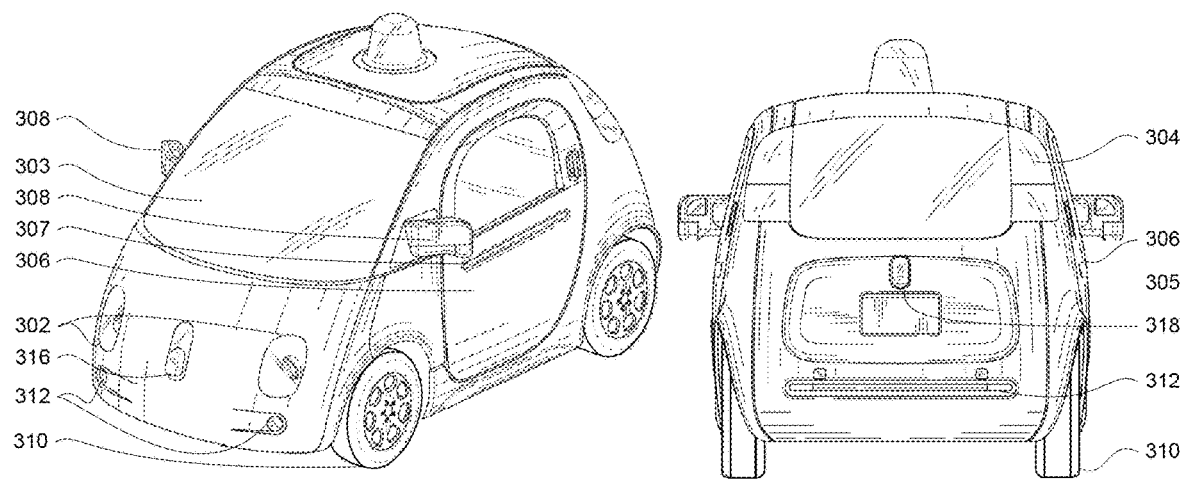
Figure 3D:
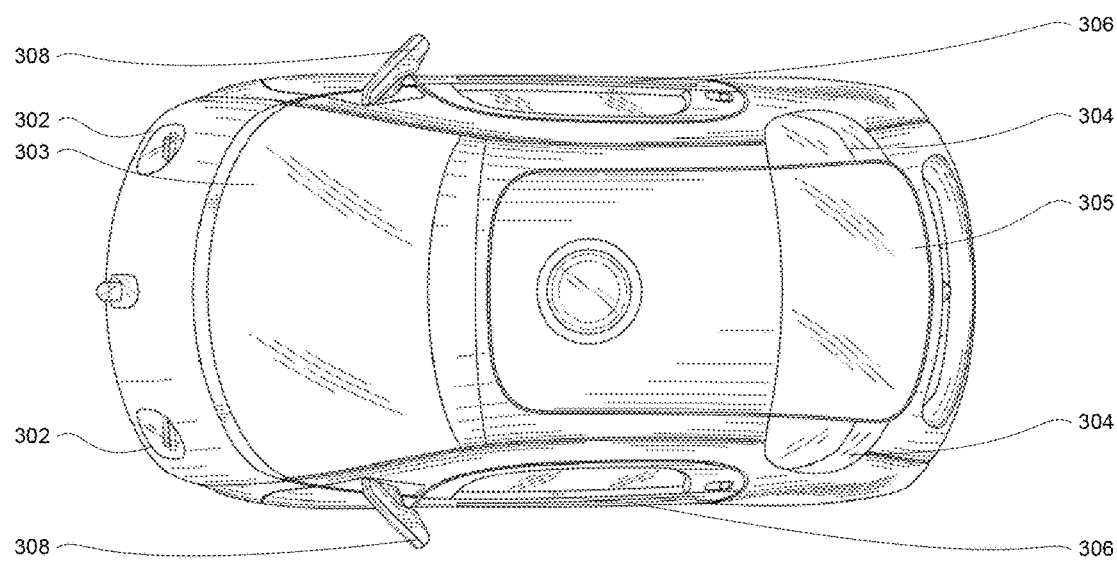

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway including intersection 202 and keep clear area identified by polygon 204. In this example, the map information 200 includes information identifying the shape, location, and other characteristics of road features such as lane lines 210, 212, 214, 216, crosswalks 220, 222, 224, sidewalks 240, and stop signs 250, 252. Although not shown, the map information may also identify road segments or rails defining locations within the roadway where the vehicle can be driven. As an example, a rail may be located between two lane lines or proximate to the middle of a lane of traffic and follow the shape and orientation (direction of traffic) for the lane of traffic. These rails may then be linked together by the computing devices in order to form a path to a destination.

Figure 8A:
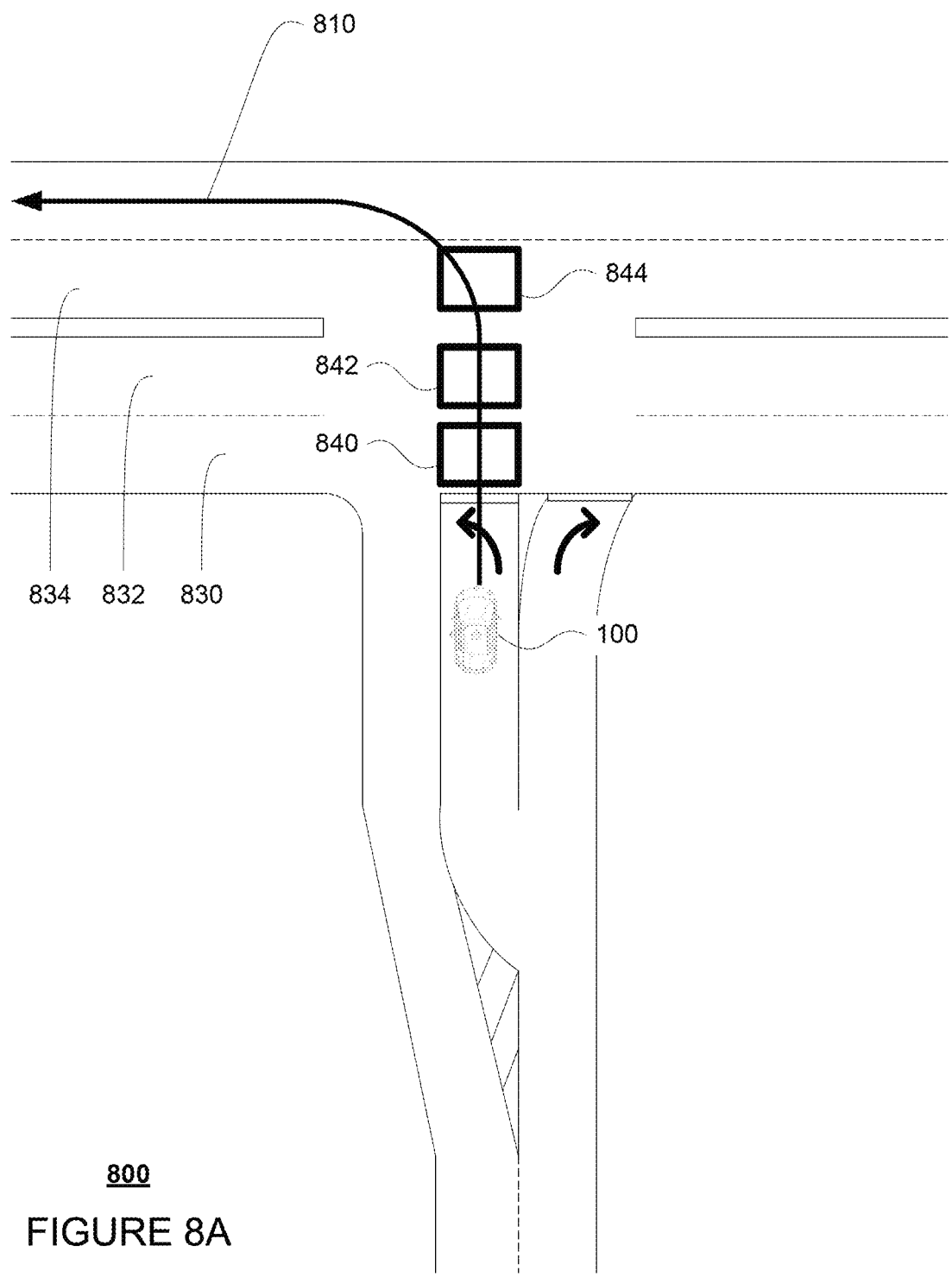
FIGS. 8A and 8B are views of a section of roadway with keep clear region polygons in accordance with aspects of the disclosure.
Figure 8B:
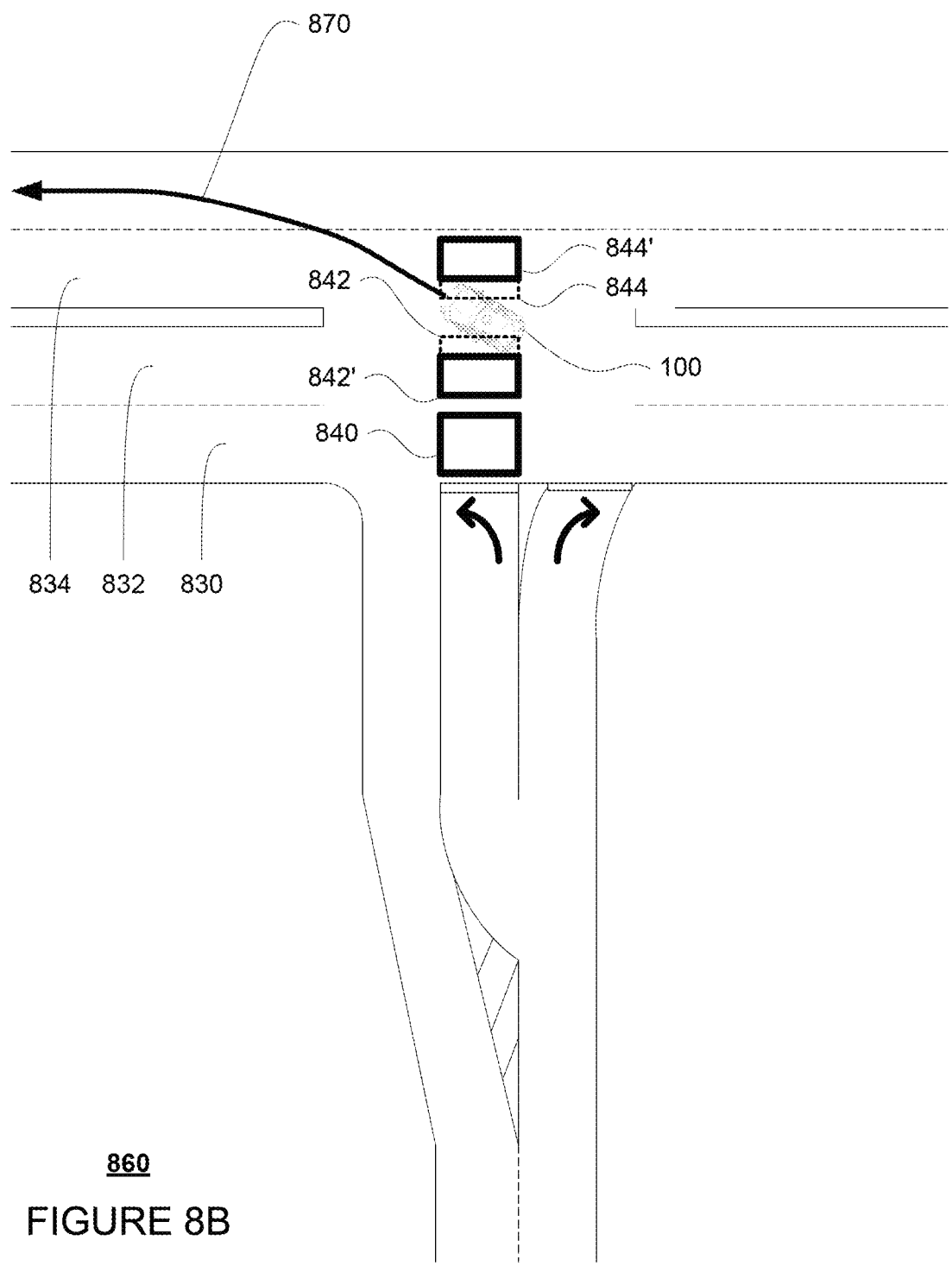

In addition to the road features, the map information may identify keep clear regions and associated types. These features may define areas where the vehicle 100 is able to drive through, but at which the vehicle should not stop. Each keep clear region may be defined in the map information as a polygon having three or more edges with an associated type. For instance, intersection 202 may be associated with a keep clear region identified by polygon 260 which corresponds to the shape of intersection 202. In this regard, polygon 260 may be associated with the keep clear region type "intersection". Crosswalks 220, 222, and 224 may each be associated with a keep clear region identified by polygons 270, 272, and 274, respectively, corresponding to the rectangular shape of each crosswalk and thus, also associated with the keep clear region type of "crosswalk". As noted above, a keep clear area is identified by polygon 204 which may be associated with a keep clear region type of "keep clear area". Other keep clear regions may be identified based on the route that the vehicle is following, such as where the vehicle crosses over a lane of traffic to reach another lane of traffic (see the discussion below regarding FIGS. 8A and 8B). Alternatively, some regions may be detected in real time, by detecting signs or indicators (such as markings on a roadway) and determining that these signs and indicators correspond to additional keep clear regions.

Figure 6:
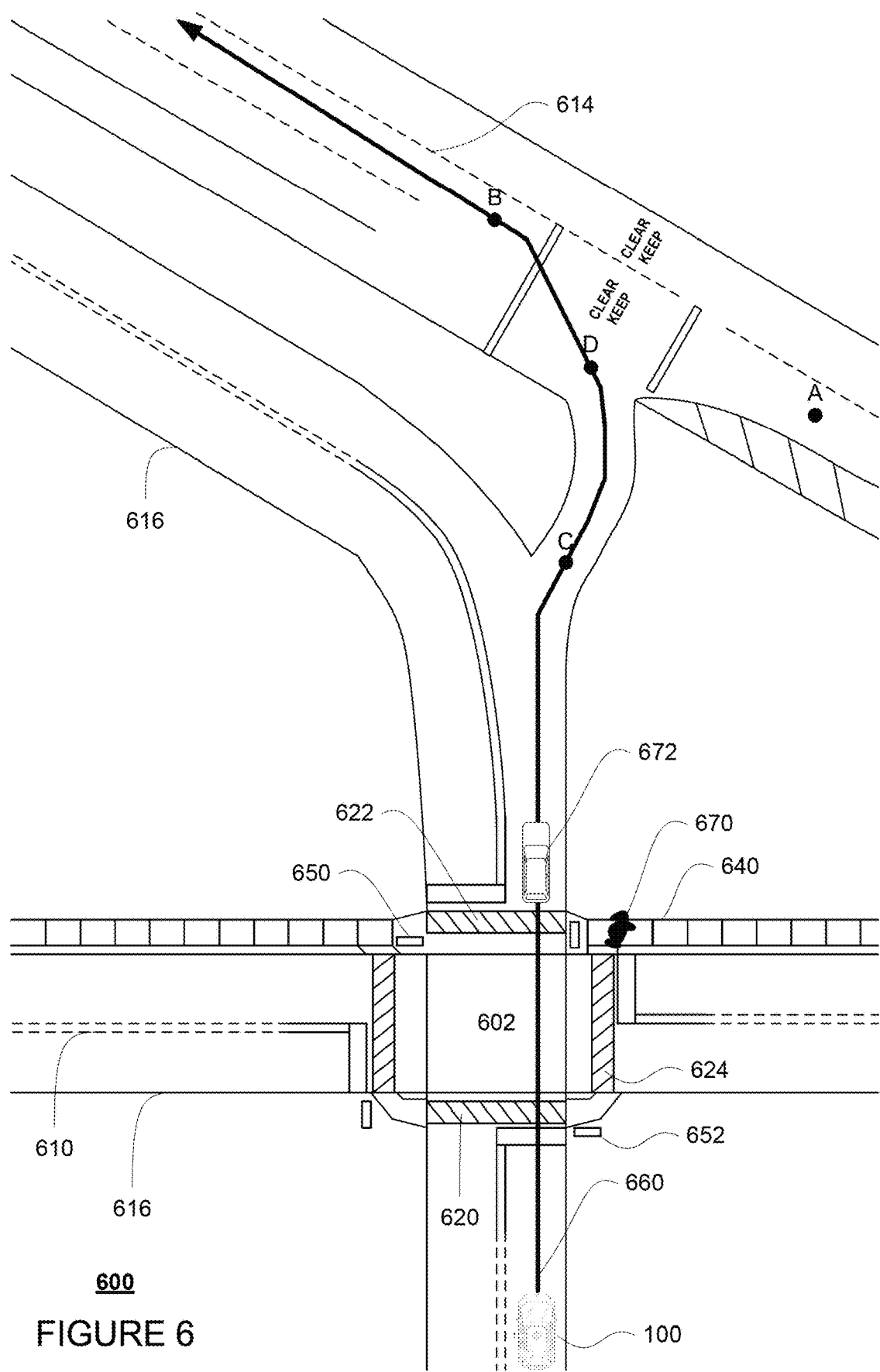
FIG. 6 is a view of a section of roadway in accordance with aspects of the disclosure.

In some instances, keep clear regions may be associated with even more detailed information about their configuration. For instance, a polygon 204 may represent a "Keep Clear" area in the map information 200. However, referring to FIG. 6, depicting a bird's eye view of the section of roadway corresponding to the map information 200, the orientation of the text as well as the painted stop lines show the intent that a vehicle at point A moving towards point B should not block the keep clear area if other vehicles ahead come to a stop, but a second vehicle moving from point C to point D and into the keep clear area does not need to observe this restriction as vehicles such as the second vehicle are the reason that the "Keep Clear" area exists at all. In this regard, the polygon 204 may be associated with information identify the direction of traffic that needs to observe the keep clear area 204 and the direction of traffic that does not need to observe the keep clear area 204.

In some instances, keep clear regions may be prioritized based on type. In other words, each keep clear region of the map information may be associated with a type. Of course, some types, such as active crosswalks and inactive crosswalks may be determined in real time based on both information from the map information (identifying a keep clear area polygon as a crosswalk) and information from the perception system (identifying whether there is a pedestrian in or proximate to the crosswalk) in order to differentiate between an active polygon and an inactive one (such as an active crosswalk and an inactive crosswalk). In this regard, an active crosswalk may include a crosswalk included in the map information and where information from the perception system 172 indicates to the computing devices 110 that there are pedestrians, pedestrians within a short distance of the crosswalk, or pedestrians exhibiting some behavior that would indicate that the pedestrians will enter the crosswalk such as approaching the crosswalk from a given distance. Similarly, an inactive crosswalk may include a crosswalk included in the map information and where information from the perception system 172 indicates to the computing devices 110 that there are no pedestrians in or within a short distance of the crosswalk.

Data 134 may also store a table or other organizational scheme that relates the types with a priority value identifying that type of keep clear region's importance or priority relative to the other types of keep clear regions. Table 1 is an example of priority values for different types of keep clear regions, here shown with a range from 0.1-0.7. Of course different values and/or scales may also be used.

TABLE 1

| Keep Clear Region Type | Priority Value |
| --- | --- |
| Railroad crossing | 0.7 |
| Active crosswalk | 0.6 |
| Intersection | 0.5 |
| Across a lane of traffic | 0.4 |
| Posted "Keep Clear" area | 0.3 |
| Posted "Don't Block the Box" area | 0.2 |
| Inactive crosswalk | 0.1 |

For instance, railroad crossings may have a higher priority value than active crosswalks. Active crosswalks may have a higher priority value than across a lane of traffic which has the right of way over the lane of traffic where the vehicle is currently traveling, intersections may have a higher priority value than across a lane of traffic, across a lane of traffic may have a higher priority value than posted "Keep Clear" or "Don't Block the Box" areas, posted "Keep Clear" or "Don't Block the Box" area may have a higher priority value than inactive crosswalks, and inactive crosswalks may have a lowest priority value of all.

Although the map information is depicted herein as an image-based map, the map information need not be entirely image based (for example, raster). For example, the map information may include one or more roadgraphs or graph networks of information such as roads, lanes of traffic, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

Data 134 may store various behavior-time models for predicting an object's future behavior for a pre-determined period of time, such as the next 10 seconds or more or less. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices 110 can then reason about hypotheses that interact with the vehicle's trajectory and are of a sufficient likelihood to be worth considering.

The computing devices 110 may control the direction and speed of the vehicle by controlling various components. By way of example, computing devices 110 may navigate the vehicle to a destination location completely autonomously using data from the detailed map information and navigation system 168. In order to maneuver the vehicle, computing devices 110 may cause the vehicle to accelerate (e.g., by increasing fuel or other energy provided to the engine of the power system 174 by acceleration system 162), decelerate (e.g., by decreasing the fuel supplied to the engine of the power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
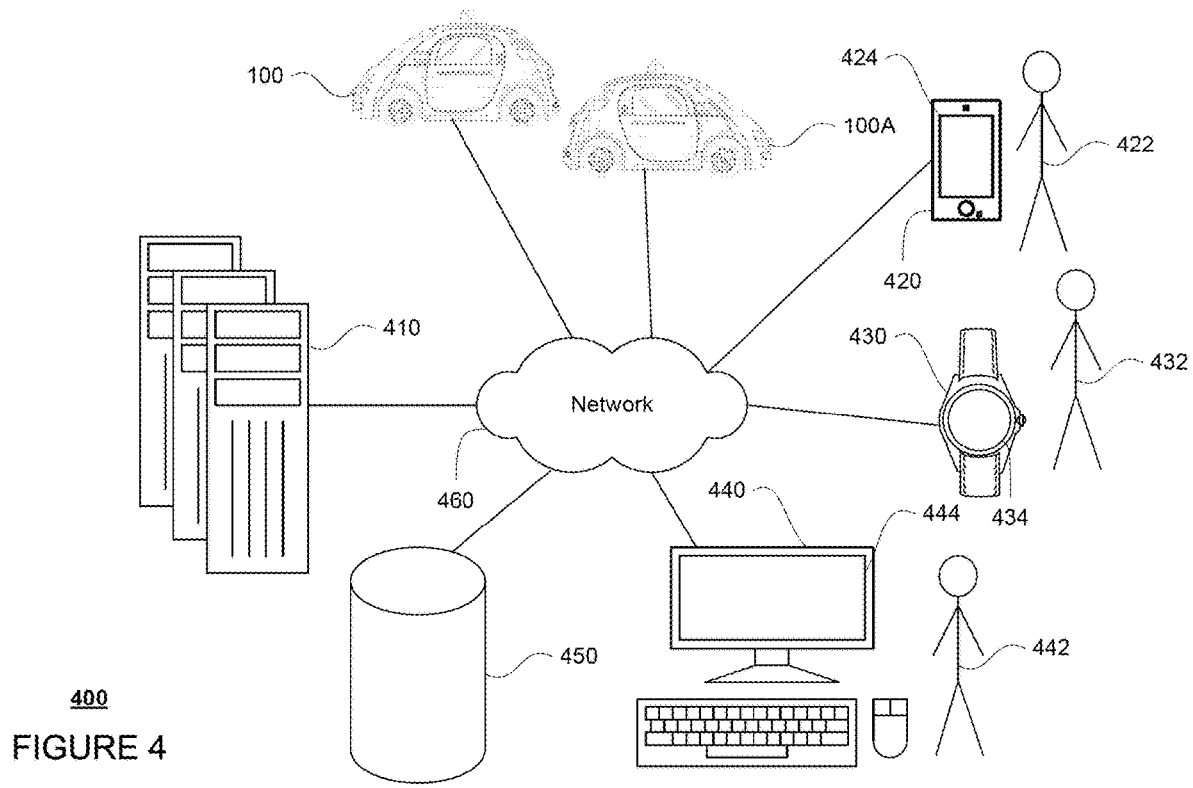
FIG. 4 is a pictorial diagram of a system in accordance with aspects of the disclosure.
Figure 5:
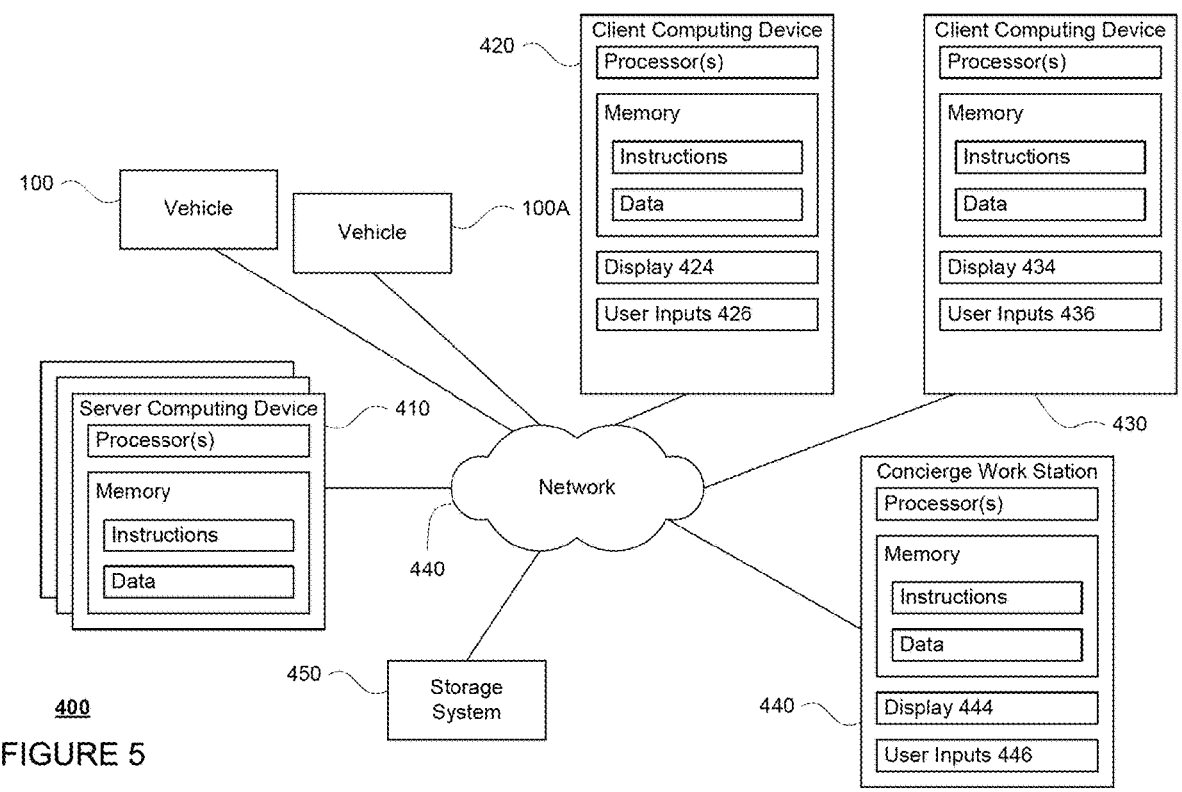
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be concierge work station used by an administrator to provide concierge services to users such as users 422 and 432. For example, user 442 may be a concierge that uses concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computing devices 110 may initiate the necessary systems to control the vehicle autonomously along a route to the destination location. For instance, the navigation system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

As noted above, FIG. 6 depicts an example view 600 of a section of roadway corresponding to the section of roadway of map information 200 of FIG. 2. In this regard, intersection 602 corresponds to intersection 202, lane lines 610, 612, 614, and 616 correspond to lane lines 210, 212, 214, and 216, crosswalks 620, 622, and 624 correspond to crosswalks 220, 222, and 224, sidewalk 640 corresponds to sidewalk 240, and stop signs 650 and 652 correspond to stop signs 250 and 252. In this example, vehicle 100 is following rout 660 to a destination (not shown)

As the vehicle is maneuvered along a route to a destination, the computing devices may combine the map information and information from the vehicle's perception system to continuously make a speed plan. As noted above, the speed plan may provide information about how to control the acceleration of the vehicle in order to follow the route for some brief period of time into the future, for instance, the next 15 seconds or more or less. In some instances, the speed plan may identify a location, for instance a physical location and point in time for stopping the vehicle. Of course, when used to control the vehicle, the precise location where the vehicle actually stops may differ slightly, and may even be further optimized for smoothness of the ride, comfort, etc.

As an example, a speed plan may be generated based on a plurality of constraints, such as maintaining a separation distance from other vehicles, ensuring there is no overlap in time and space with a projected location of other objects, etc. In some instances, as part of this speed plan, the computing devices may determine an ideal location where the vehicle is able to stop within some short period of time into the future or distance along the route. For example, referring to FIG. 6, the vehicle's computing devices may periodically determine a speed plan for maneuvering vehicle 100 along the route 660. In order to do so, information from the perception system 172, including information identifying pedestrian 670 and stopped vehicle 672 may be provided to the computing devices 110.

In generating a speed plan, the computing devices may determine how to control the vehicle without stopping in any of the keep clear regions identified in the map information. For instance, the computing devices 110 may first identify a subset of keep clear regions that are relevant to the vehicle's path and current location. This may include keep clear regions that intersect with the route of the vehicle that are within some distance along the route. In other words, considering keep clear regions too far from the vehicle or not relevant to the vehicle's current path maybe inefficient.

Figure 7:
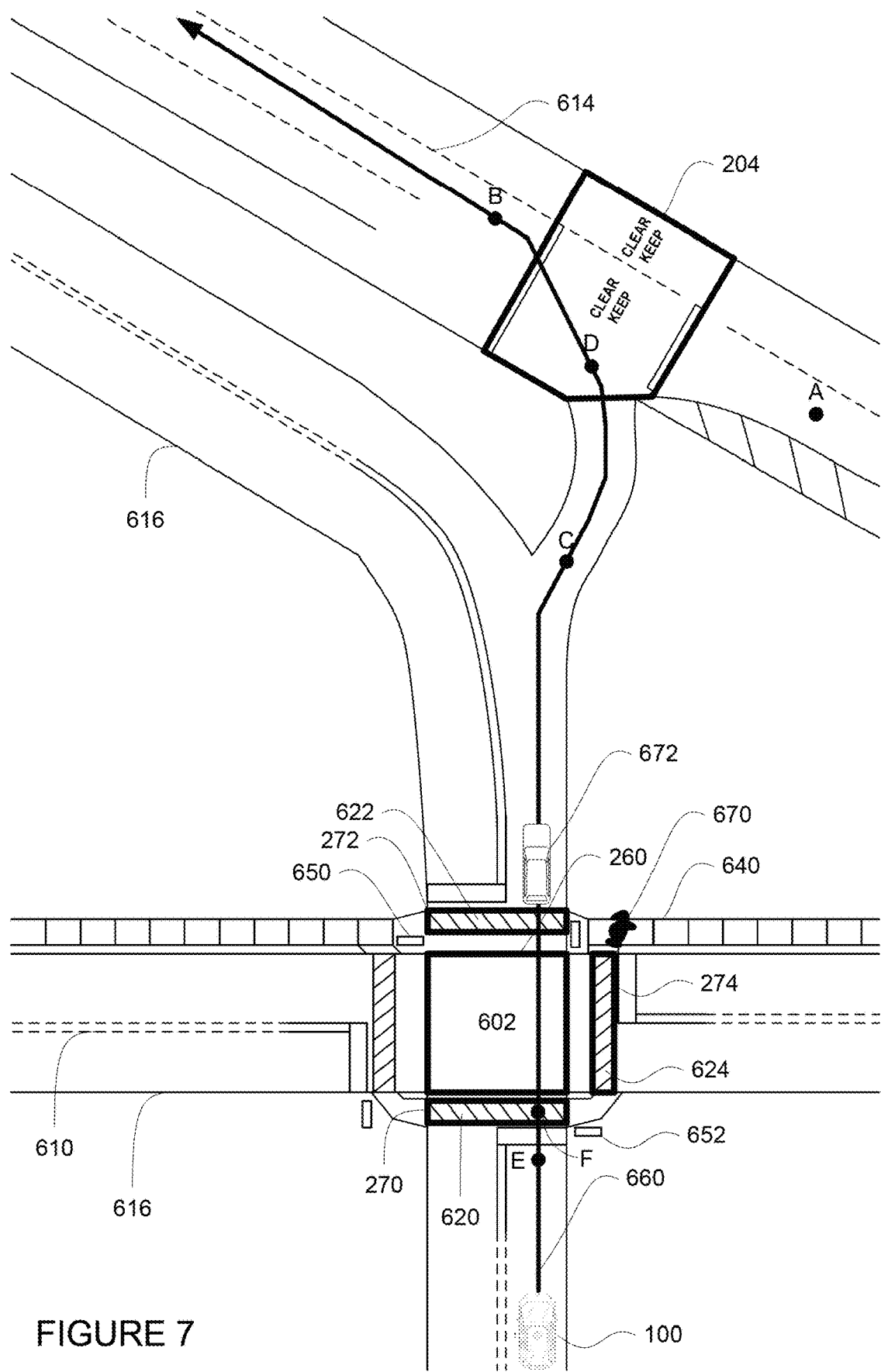
FIG. 7 is a view of a section of roadway with keep clear region polygons in accordance with aspects of the disclosure.

FIG. 7 is a view of example 600 of FIG. 6 overlaid with the keep clear regions of map information 200. In this example, the keep clear region identified by polygons 260, 270, 272, 274, and 204. Computing devices 110 may use this information to identify a subset of the keep clear regions of map information 200 that are relevant to route 660. For instance, route 660 intersects with keep clear regions of polygons 260, 270, 272, and 204. In addition, because vehicle 100 will be maneuvering through keep clear region identified by polygon 204 from point C to point D, the keep clear region identified by polygon 204 is not relevant to the route 660. Thus, for the location of vehicle 100 in example 600 following route 660, the computing devices 110 may identify a subset of keep clear regions that include the keep clear regions identified by polygons 260, 270, and 272.

For each relevant keep clear region of the subset, the computing devices may generate a corresponding constraint, for instance, that the vehicle cannot stop in that keep clear regions. Thus, the computing devices 110 may generate a constraint that the vehicle cannot stop in any of the keep clear regions identified by polygons 260, 270, and 272.

The computing devices may attempt to generate a speed plan that solves for all of the keep clear constraints as well as any other constraints (such as those discussed above). For instance, the computing devices may first attempt to find a feasible (or rather, both safe and comfortable for passenger without too much acceleration or deceleration) speed plan that obeys all of the constraints of the subset of keep clear regions. Returning to FIG. 7, in other words, the vehicle's computing devices may determine how to control the vehicle 100 in order to avoid stopped vehicle 672 while also satisfying the constraints that the vehicle cannot stop in any of the keep clear regions identified by polygons 260, 270, and 272. Assuming vehicle 100 is traveling at speed where the vehicle is able to stop before the vehicle reaches crosswalk 620, the speed plan may include stopping vehicle at point E.

If this is not possible, the computing devices may relax the lowest priority constraints and try again. This ignoring the lowest priority value keep clear regions of the subset may be repeated as many times as necessary until a feasible speed plan is generated.

As noted above, each keep clear region identified in the map information may be associated with a priority value. These priority values may identify the importance or priority relative to other keep clear regions of the map information. In other words, it may be more important for the vehicle to avoid stopping in areas having the highest or higher priority values than areas having lower priority values. When a lower priority keep clear region cannot be avoided the computing devices may simply ignore the constraint for that keep clear region (or rather include this region in the speed plan as a possible location for stopping the vehicle).

Returning to the example of FIG. 7, the subset includes the keep clear regions identified by polygons 260, 270, and 272. Polygon 260 corresponds to intersection 202 and 602, polygon 270 corresponds to crosswalk 220 and 620, and polygon 270 corresponds to crosswalk 220 and 620. Here, crosswalk 620 is inactive while crosswalk 622 is active, as pedestrian 670 is approaching crosswalk 622 from sidewalk 640. In this regard, the computing devices may identify crosswalk 620 as an inactive crosswalk as there are no pedestrians within a first distance such as 1 meter or more or less, within the crosswalk, or approaching crosswalk 620 from within a second distance such as 3 meters or more or less. Similarly, the computing devices 110 may identify crosswalk 622 as an active crosswalk based upon the identification of pedestrian 670 approaching crosswalk 622 from sidewalk 640. As noted above, because it is an active crosswalk, crosswalk 622 may have a higher priority value than intersection 602 and crosswalk 620 which is inactive. In addition, intersection 602 may have a higher priority value than crosswalk 620.

In this example, when the computing devices are unable to determine a speed plan that satisfies the constraints for all of the keep clear regions of the subset, the constraint for polygon 272 corresponding to crosswalk 220 and 620, may be ignored as the keep clear region corresponding to polygon 272 has the lowest priority value. Thus, the computing devices 110 may attempt to determine a feasible speed plan that avoids stopping in polygon 260 and 270, but that can stop within polygon 272. In other words, the computing devices may be more likely to abruptly decelerate the vehicle to avoid the active crosswalk (crosswalk 620) or an intersection (intersection 602) than to avoid the inactive crosswalk (crosswalk 622). Thus, in this example, the computing devices may generate a speed plan that includes stopping the vehicle 100 at point F within crosswalk 620.

Again, this ignoring the lowest priority value keep clear regions of the subset may be repeated as many times as necessary until a feasible speed plan is generated. In other words, this process may be repeated until the subset is empty.

However, in some instances, no feasible speed plan may be possible. In other words, returning to the example of FIG. 7, computing devices may be unable to generate a speed plan that can safely stop the vehicle 100 before reaching stopped vehicle 672 even when the computing devices are ignoring all of the keep clear regions of the subset (i.e. all of the keep clear regions identified by polygons 260, 270, and 272 have been ignored). In this instance, if blocking a higher priority region is inevitable, the computing devices may generate a speed plant that involves taking some type of reconciliation action, such as changing between lanes of traffic, making a turn, moving in reverse, moving or pulling over, calling for help, etc.

The computing devices can use the speed plan to control the vehicle. Again, this may involve controlling the acceleration or deceleration of the vehicle. As noted above, in some cases, the speed plan may include stopping the vehicle at a location defined in the speed plan (in space and/or time). Of course, when the speed plan is used to control the vehicle, the precise location where the vehicle actually stops may differ slightly from the location of the speed plan, and may even be further optimized for smoothness of the ride, comfort, etc.

The stopping may be necessitated by any number of different reasons, including for instance, other objects (such as stopped vehicle 672 in example 600, objects or debris in the roadway, traffic lights, pedestrians, etc.), predicted object locations (such as where another vehicle is likely to come to a stop), occlusions (such as situations where the computing devices 110 are unable to rule out the presence of one object behind another), zones where the vehicle must come to a stop (such as construction areas, edges of the map information, policy zones like tollbooths, railroad crossings, etc.), vehicle malfunctions or other system issues, passenger or remote requests or commands to stop the vehicle etc.

The speed plan may be generated periodically, for instance, several times per second or every few seconds or more or less. In this regard, the computing devices may control the vehicle according to the most recently generated speed plan, stopping the vehicle where such stopping is in accordance with the most current speed plan.

In some examples, the vehicle needs to be stopped because other vehicles are stopping and physically "stacking" up in front of the vehicle. To avoid stopping in one of the keep clear regions, as part of determining a speed plan, the computing devices may observe the behavior of other vehicles and predict where those other vehicles would likely end up if they came to an abrupt stop.

In addition to figuring out where each vehicle would stop, the vehicle's computing devices may also consider the likelihood that each other vehicle in front of the vehicle (or a further vehicle in front of the other vehicle) will come to a stop based on predictive models (if those other vehicles are not already stopped). The computing devices may choose to ignore a stopping vehicle if the likelihood is very low, such as where there are no features ahead or observed deceleration that implies the other vehicle is going to be stopping.

To make a prediction, the computing devices may estimate the distance that each stacking vehicle would occupy individually and how much space between the stacking vehicles would be unoccupied using a model that provides an estimated length of a vehicle given an actually observed shape and size of the rear of the stacking vehicle. These predictions may then be used to attempt to find an appropriate location to stop according to the priority of any relevant keep clear regions or take a reconciliation action if needed.

In still further examples, the computing devices may actually adjust the default response to keep clear regions rather than simply ignoring the constraints associated with those regions. For instance, there may be a default minimum clearance value or acceptable amount of overlap allowed when stopping at or near a keep clear region. This value may range from some negative distance (some overlap) to a positive distance (no overlap with some buffer between the vehicle and the region). The value may also be adjusted in order to generate a feasible stopping plan. As an example, the minimum clearance value may be adjusted in order to allow the vehicle to penetrate the polygons low priority keep clear regions. Alternatively or in addition, the computing devices may adjust the separation distance between the vehicle and another vehicle in order to reduce the amount of overlap with a higher priority keep clear region.

By adjusting the default response, the vehicle can better "fit" between two keep clear regions without the need for a reconciliation action which could be dangerous. For instance, in the case of a left turn with a divided median, the vehicle may be required to stop between two regions to avoid stopping across a lane of traffic. Of course, the shape of the regions may mean that the area between them is insufficient for the vehicle to stop without overlapping one or both regions. For instance, as shown in example 800 of FIG. 8A, vehicle 100 is attempting to make an unprotected left and turn across several lanes of traffic. To do so, the vehicle must pass through keep clear regions identified by polygons 840, 842, and 844 which correspond to stopping across lanes of traffic 830, 832, and 834, respectively. In this example, the subset may thus include keep clear regions identified by polygons 840, 842, and 844. Each of these polygons may then be used to generate constraints and generate a speed plan as described above.

In some cases, the vehicle may have to stop before completing a turn in order to wait for traffic approaching vehicle 110 from lane of traffic 834. To avoid the vehicle not stopping and possibly causing a collision with another vehicle or object, the computing devices may simply adjust each of the polygons by small increments and at the same time change the orientation of the vehicle relative to the route in small increments until the vehicle is able to fit as much as possible between two of the polygons. For instance, the computing devices may adjust the shape of polygons 842 and 844 and maneuver vehicle 100 as shown in example 860 of FIG. 8B. In this example, the vehicle is maneuvered between polygons 840 and 842 reoriented in order to fit as much as possible between the adjusted polygons 842' and 844'. For clarity, in FIG. 8B, the original size and shape of polygons 842 and 844 is shown in dashed line. Thus, vehicle 100's route 810 is changed slightly to route 870.

Figure 9:
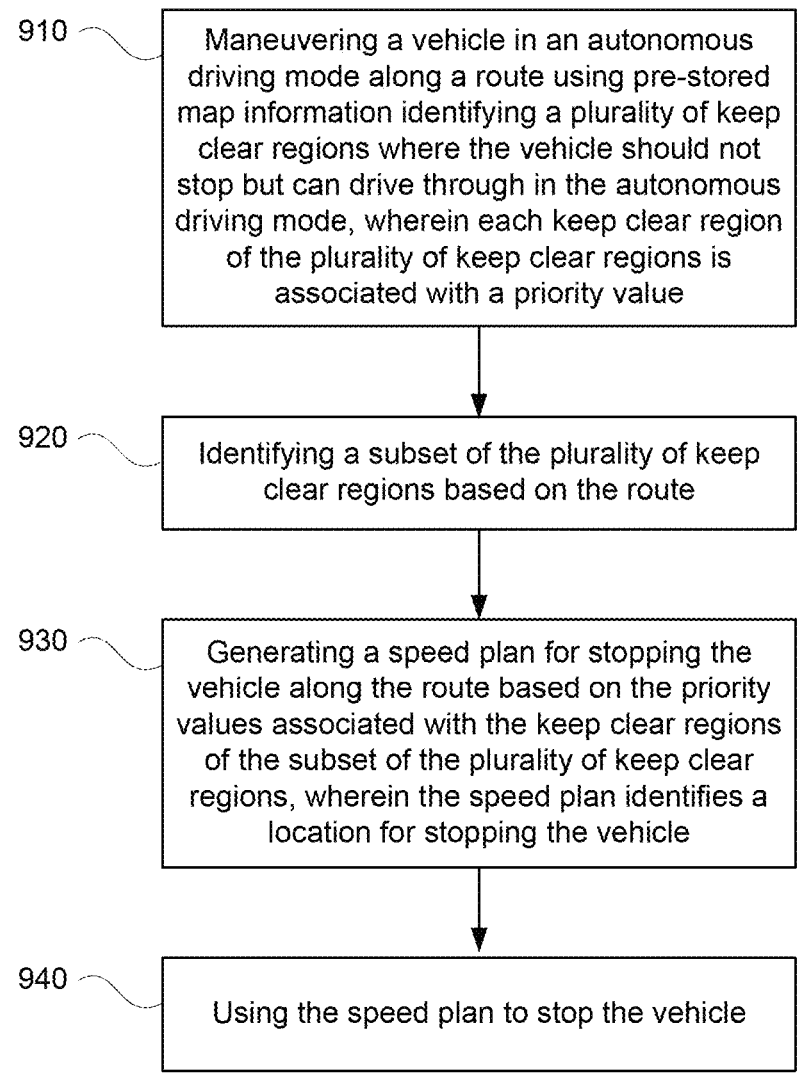
FIG. 9 is a flow diagram in accordance with aspects of the disclosure.

FIG. 9 is an example flow diagram 900 in accordance which may be performed by one or more computing devices of a vehicle, such as computing devices 110 of vehicle 100 in order to maneuver the vehicle 100 in an autonomous driving mode. At block 910, a vehicle is maneuvered in an autonomous driving mode along a route using pre-stored map information. This pre-stored map information identifies a plurality of keep clear regions where the vehicle should not stop but can drive through in the autonomous driving mode. In addition, each keep clear region of the plurality of keep clear regions is associated with a priority value. At block 920, a subset of the plurality of keep clear regions is identified based on the route. At block 930, a speed plan for stopping the vehicle along is generated based on the priority values associated with the keep clear regions of the subset of the plurality of keep clear regions, wherein the speed plan identifies a location for stopping the vehicle. The speed plan is used to stop the vehicle at the location at block 940.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of maneuvering a vehicle in an autonomous driving mode, the method comprising:
   maneuvering, by one or more processors, the vehicle in the autonomous driving mode along a route using pre-stored map information, the pre-stored map information identifying a plurality of keep clear regions that the vehicle can drive through in the autonomous driving mode but should not stop;
   identifying, by the one or more processors, a subset of the plurality of keep clear regions of the route, each one of the subset of the plurality of keep clear regions being within a predetermined distance along the route and intersects with the route;
   generating, by the one or more processors, a speed plan for stopping the vehicle without stopping within each one of the subset of the plurality of the keep clear regions; and
   using, by the one or more processors, the speed plan to stop the vehicle.

2. The method of claim 1, wherein the speed plan identifies a future location for stopping the vehicle prior to a destination of the speed plan without stopping at the subset of the plurality of keep clear regions.

3. The method of claim 1, wherein the speed plan includes information for controlling the deceleration of the vehicle to stop the vehicle without stopping within the subset of the plurality of keep clear regions.

4. The method of claim 1, wherein the subset of the plurality of keep clear regions are relevant to a path and a current location of the vehicle.

5. The method of claim 1, wherein determining the speed plan includes adjusting a given keep clear region of the subset of the plurality of keep clear regions, and the given keep clear region has a lowest priority value of all of the keep clear regions of the subset of the plurality of keep clear regions.

6. The method of claim 1, wherein at least one of the subset of the plurality of keep clear regions corresponds to an active crosswalk and at least one of the subset of the plurality of keep clear regions corresponds to an inactive crosswalk, and the active crosswalk is associated with a higher priority value than the inactive crosswalk.

7. The method of claim 1, wherein at least one of the subset of the plurality of keep clear regions corresponds to an active crosswalk, at least one of the subset of the plurality of keep clear regions corresponds to an intersection, and the active crosswalk is associated with a higher priority value than the intersection.

8. The method of claim 1, wherein at least one of the subset of the plurality of keep clear regions corresponds to an area that crosses a lane of traffic.

9. The method of claim 1, wherein generating the speed plan includes adjusting a default minimum clearance value for a given keep clear region of the subset of the plurality of keep clear regions.

10. The method of claim 9, wherein the adjusted default minimum clearance value has a negative value to define an acceptable amount of overlap with the given keep clear region.

11. A system for maneuvering a vehicle in an autonomous driving mode, the system comprising:
    one or more processors configured to:
      maneuver the vehicle in the autonomous driving mode along a route using pre-stored map information, the pre-stored map information identifying a plurality of keep clear regions that the vehicle can drive through in the autonomous driving mode but should not stop;
      identify a subset of the plurality of keep clear regions of the route, each one of the subset of the plurality of keep clear regions being within a predetermined distance along the route and intersects with the route;
      generate a speed plan for stopping the vehicle without stopping within each one of the subset of the plurality of the keep clear regions; and
      use the speed plan to stop the vehicle.

12. The system of claim 11, wherein the speed plan identifies a future location for stopping the vehicle prior to a destination of the speed plan without stopping at the subset of the plurality of keep clear regions.

13. The system of claim 11, wherein the speed plan includes information for controlling the deceleration of the vehicle to stop the vehicle without stopping within the subset of the plurality of keep clear regions.

14. The system of claim 11, wherein the subset of the plurality of keep clear regions are relevant to a path and a current location of the vehicle.

15. The system of claim 11, wherein determining the speed plan includes adjusting a given keep clear region of the subset of the plurality of keep clear regions, and the given keep clear region has a lowest priority value of all of the keep clear regions of the subset of the plurality of keep clear regions.

16. The system of claim 11, wherein at least one of the subset of the plurality of keep clear regions corresponds to an active crosswalk and at least one of the subset of the plurality of keep clear regions corresponds to an inactive crosswalk, and the active crosswalk is associated with a higher priority value than the inactive crosswalk.

17. The system of claim 11, wherein at least one of the subset of the plurality of keep clear regions corresponds to an active crosswalk, at least one of the subset of the plurality of keep clear regions corresponds to an intersection, and the active crosswalk is associated with a higher priority value than the intersection.

18. The system of claim 11, wherein at least one of the subset of the plurality of keep clear regions corresponds to an area that crosses a lane of traffic.

19. The system of claim 11, wherein generating the speed plan includes adjusting a default minimum clearance value for a given keep clear region of the subset of the plurality of keep clear regions.

20. The system of claim 19, wherein the adjusted default minimum clearance value has a negative value to define an acceptable amount of overlap with the given keep clear region.

* * * * *